(12) United States Patent
Wang et al.

(10) Patent No.: US 8,154,975 B1
(45) Date of Patent: Apr. 10, 2012

(54) SERVOING SYSTEM FOR MULTIPLE SPOT REGISTRATION FOR HOLOGRAPHIC REPLICATION SYSTEM

(75) Inventors: Xuefeng Wang, Schenectady, NY (US); Pierino Gianni Bonanni, Loudonville, NY (US); Xiaolei Shi, Niskayuna, NY (US); Zhiyuan Ren, Malta, NY (US); Hua Xia, Niskayuna, NY (US); Victor Petrovich Ostroverkhov, Ballston Lake, NY (US); Xinghua Wang, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/949,621

(22) Filed: Nov. 18, 2010

(51) Int. Cl.
*G11B 7/00* (2006.01)
(52) U.S. Cl. .......................................... 369/103
(58) Field of Classification Search ................ 369/103, 369/44.37, 94; 359/10, 28, 30–32
See application file for complete search history.

(56) References Cited

U.S. PATENT DOCUMENTS

| | | |
|---|---|---|
| 5,195,152 A | 3/1993 | Gupta |
| 5,483,511 A | 1/1996 | Jewell et al. |
| 5,535,189 A | 7/1996 | Alon et al. |
| 5,574,712 A | 11/1996 | Alon et al. |
| 5,825,743 A | 10/1998 | Alon et al. |
| 5,917,797 A | 6/1999 | Kosoburd |
| 6,212,148 B1 | 4/2001 | Hesselink et al. |
| 6,272,095 B1 | 8/2001 | Liu et al. |
| 6,501,571 B1 | 12/2002 | Wang et al. |
| 6,545,968 B1 | 4/2003 | Oakley |
| 6,791,914 B1 | 9/2004 | Marchant |
| 6,898,167 B2 | 5/2005 | Liu et al. |
| 6,940,805 B2 | 9/2005 | Finkelstein et al. |
| 7,187,481 B1 * | 3/2007 | Sigel et al. ...................... 359/10 |
| 7,388,695 B2 | 6/2008 | Lawrence et al. |
| 7,453,611 B2 | 11/2008 | Raguin et al. |
| 7,898,925 B2 * | 3/2011 | Shiono et al. ................. 369/103 |
| 7,911,919 B2 * | 3/2011 | Sugita et al. .................. 369/103 |
| 7,944,794 B2 * | 5/2011 | Fujita et al. ................... 369/103 |

(Continued)

FOREIGN PATENT DOCUMENTS

EP 491458 6/1992

(Continued)

OTHER PUBLICATIONS

U.S. Appl. No. 12/949,628, filed Nov. 18, 2010, Xuefeng Wang et al.

(Continued)

*Primary Examiner* — Thang Tran
(74) *Attorney, Agent, or Firm* — Fletcher Yoder

(57) ABSTRACT

The present techniques provide methods and systems for controlling the recording of micro-holograms using multiple counter-propagating light beams over multiple data tracks of a holographic disk. Imperfections in a holographic disk or movement of the disk during a recording process may cause signal beams to deviate from target data tracks. In some embodiments, a tracking beam is directed to a reference layer in the disk. Deviation of the reference beam from a target groove in the reference layer may be indicative of tracking errors. A detector may detect reflections of the tracking beam and generate an error signal in response to detected tracking errors. Servo-mechanical devices may actuate (e.g., radially, tangentially, or axially translate, rotate, and/or tilt) one or more optical components through which the counter-propagating light beams are emitted to compensate for tracking errors.

32 Claims, 10 Drawing Sheets

U.S. PATENT DOCUMENTS

| | | | |
|---|---|---|---|
| 8,054,519 B2 * | 11/2011 | Su et al. ............................ 359/10 |
| 2002/0110077 A1 | 8/2002 | Drobot et al. |
| 2005/0259304 A1 | 11/2005 | Someno |
| 2006/0087929 A1 | 4/2006 | Assis et al. |
| 2007/0076562 A1 * | 4/2007 | Horimai ........................ 369/103 |
| 2007/0086309 A1 | 4/2007 | Yang |
| 2008/0089209 A1 | 4/2008 | Miyamoto et al. |
| 2008/0252951 A1 | 10/2008 | Knittel |
| 2009/0003153 A1 | 1/2009 | Yamatsu |
| 2009/0003155 A1 * | 1/2009 | Tanabe ........................ 369/47.5 |
| 2009/0003177 A1 | 1/2009 | Tanabe |
| 2009/0052312 A1 | 2/2009 | Hayashi et al. |
| 2009/0080317 A1 | 3/2009 | Martinez |
| 2009/0147333 A1 | 6/2009 | Yamatsu et al. |
| 2009/0174920 A1 * | 7/2009 | Jeong et al. ..................... 359/31 |
| 2009/0175138 A1 * | 7/2009 | Kim et al. ................... 369/44.11 |
| 2009/0225641 A1 * | 9/2009 | Sugita et al. .................. 369/103 |
| 2010/0046338 A1 * | 2/2010 | Saito et al. .................... 369/103 |
| 2010/0165818 A1 * | 7/2010 | Ostroverkhov et al. ...... 369/103 |

FOREIGN PATENT DOCUMENTS

| | | |
|---|---|---|
| EP | 1494221 | 1/2005 |
| EP | 1522999 | 4/2005 |
| EP | 2104098 | 9/2009 |
| WO | WO2006064426 | 6/2006 |

OTHER PUBLICATIONS

U.S. Appl. No. 12/905,853, filed Oct. 15, 2010, Xinghua Wang et al.
U.S. Appl. No. 12/907,824, filed Oct. 19, 2010, Victor Petrovich Ostroverkhov et al.

* cited by examiner (MULTIPLE PICKUPS)

(MULTIPLE CHANNELS IN A SINGLE PICKUP)

SERVOING SYSTEM FOR MULTIPLE SPOT REGISTRATION FOR HOLOGRAPHIC REPLICATION SYSTEM

BACKGROUND

The present techniques relate generally to bit-wise holographic data storage techniques. More specifically, the techniques relate to methods and systems for parallel replication in holographic disks.

As computing power has advanced, computing technology has entered new application areas, such as consumer video, data archiving, document storage, imaging, and movie production, among others. These applications have provided a continuing push to develop data storage techniques that have increased storage capacity and increased data rates.

One example of the developments in data storage technologies may be the progressively higher storage capacities for optical storage systems. For example, the compact disk, developed in the early 1980s, has a capacity of around 650-700 MB of data, or around 74-80 minutes of a two channel audio program. In comparison, the digital versatile disk (DVD) format, developed in the early 1990s, has a capacity of around 4.7 GB (single layer) or 8.5 GB (dual layer). Furthermore, even higher capacity storage techniques have been developed to meet increasing demands, such as the demand for higher resolution video formats. For example, high-capacity recording formats such as the Blu-ray Disc™ format is capable of holding about 25 GB in a single-layer disk, or 50 GB in a dual-layer disk. As computing technologies continue to develop, storage media with even higher capacities may be desired. For example, holographic storage systems and micro-holographic storage systems are examples of other developing storage technologies that may achieve increased capacity requirements in the storage industry.

Holographic storage is the storage of data in the form of holograms, which are images of three dimensional interference patterns created by the intersection of two beams of light in a photosensitive storage medium. Both page-based holographic techniques and bit-wise holographic techniques have been pursued. In page-based holographic data storage, a signal beam containing digitally encoded data (e.g., a plurality of bits) is superposed on a reference beam within the volume of the storage medium resulting in a chemical reaction which modulates the refractive index of the medium within the volume. Each bit is therefore generally stored as a part of the interference pattern. In bit-wise holography or micro-holographic data storage, every bit is written as a micro-hologram, or Bragg reflection grating, typically generated by two counter-propagating focused recording beams. The data is then retrieved by using a read beam to reflect off the micro-hologram to reconstruct the recording beam.

Bit-wise holographic systems may enable the recording of closer spaced and layer-focused micro-holograms, thus providing much higher storage capacities than prior optical systems. However, the bandwidth of bit-wise holographic systems may be limited by the transfer rate of a single communication channel and the rotation speed of the holographic storage disk. For example, a typical disk rotation speed in a Blu-ray™ system at 12×BD rate may result in a single-channel transfer at approximately 430 Mbits/second. At this transfer rate, the recording time per data layer in the disk is approximately 500 seconds. Techniques for increasing transfer rates in bit-wise micro-holographic systems may be advantageous.

BRIEF DESCRIPTION

An embodiment of the present techniques provides a method of recording data in a holographic disk. The method includes emitting a plurality of signal beams from a first set of optical components towards a first side of the holographic disk, emitting a plurality of reference beams from a second set of optical components towards a second side of the holographic disk, and determining whether the plurality of signal beam spots is aligned in the plurality of target data tracks in a target layer of the holographic disk. The method further includes determining whether each reference beam in the plurality of reference beams substantially overlaps with a corresponding signal beam in the plurality of signal beams to form a plurality of illumination spots during the recording of the holographic disk and adjusting one or more of the first set of optical components and the second set of optical components when the plurality of illumination spots is determined to not align in the plurality of target data tracks.

Another embodiment provides a system for recording micro-holograms on a holographic disk. The system includes two optical systems. The first optical system is configured to focus a plurality of signal beams in a plurality of target data layers from a first side of the holographic disk. The first optical system is also coupled to a first set of servo-mechanical devices configured to actuate a first set of optical components in the first optical system to align each of the plurality of signal beams in a respective track of a plurality of target data tracks. The second optical system is configured to transmit a plurality of reference beams towards the target data layer from a second (opposite) side of the holographic disk. The second optical system includes a second set of optical components configured to be actuated to align each of the plurality of reference beams with a respective signal beam of the plurality of signal beams to form an interference pattern in a respective track of the plurality of target data tracks in the one or more target data layers.

Another embodiment provides a system for pre-formatting a holographic disc. The system includes a first optical head configured to impinge a plurality of signal beams to a plurality of data tracks in the holographic disk and configured to impinge a tracking beam to a target groove in a reference layer in the holographic disk, wherein the target groove corresponds to the plurality of data tracks. The system also includes a second optical head configured to impinge a plurality of reference beams to the plurality of data tracks, such that the plurality of signal beams and the plurality of reference beams interfere in a data layer to form an interference pattern comprising a plurality of illumination spots. The system includes a tracking detector configured to detect a reflection of the tracking beam from the holographic disk and configured to generate a first set of error signals when the reflection of the tracking beam indicates that the tracking beam is not focused on the target groove. The system also includes a second set of detectors configured to detect one or more of a transmission of the plurality of signal beams or a transmission of the plurality of reference beams and configured to generate a second set of error signals when the plurality of reference beams are not aligned with respective signal beams of the plurality of signal beams. Furthermore, the system includes one or more servo-mechanical devices coupled to the first optical head and the second optical head and configured to receive the error signals from one or more of the tracking detector and the second set of detectors and configured to actuate optical components in one or more of the first optical head and the second optical head in response to the error signals.

DRAWINGS

These and other features, aspects, and advantages of the present invention will become better understood when the following detailed description is read with reference to the accompanying drawings in which like characters represent like parts throughout the drawings, wherein.

Figure 3A:
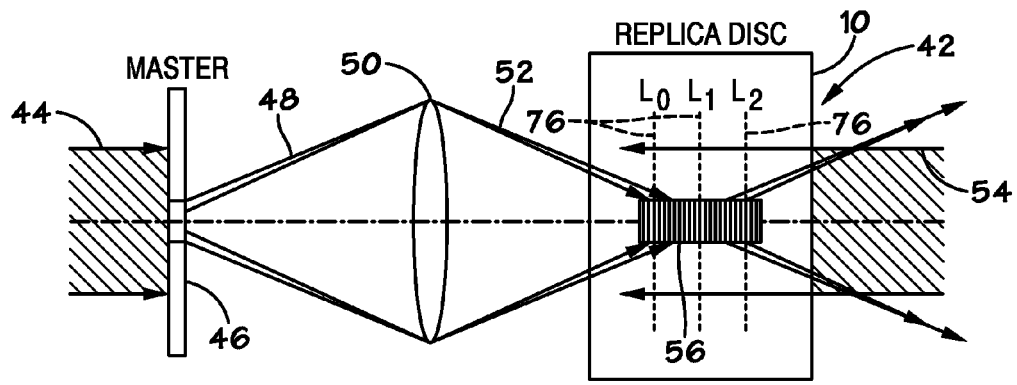
Figure 3B:
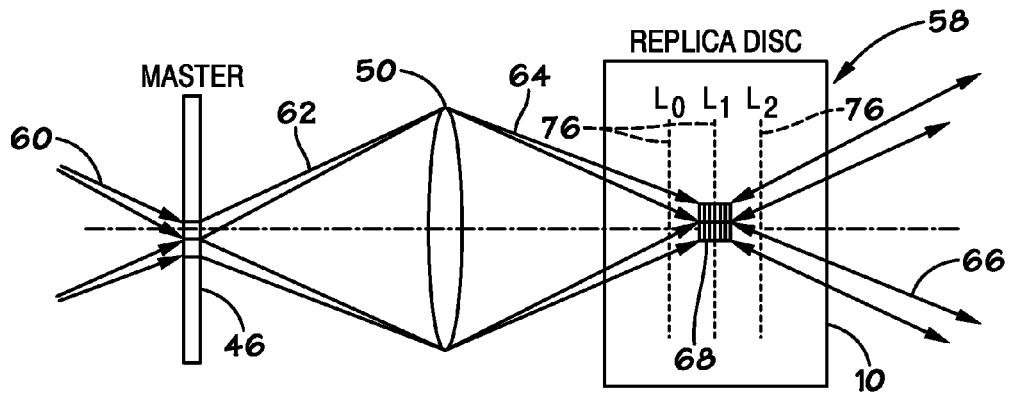
Figure 4:
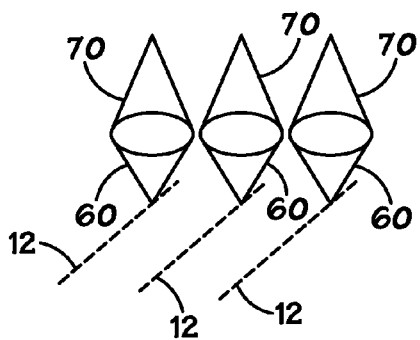
Figure 5:
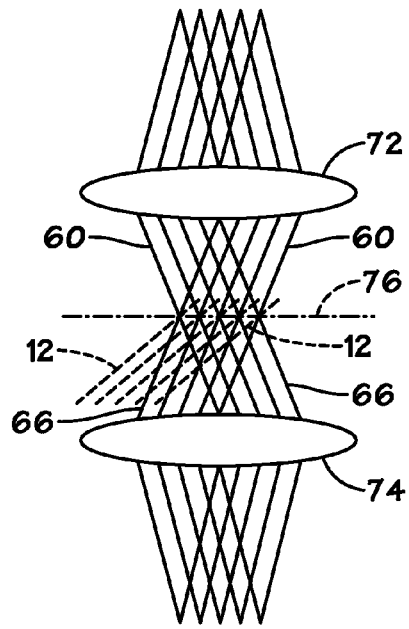
Figure 6:
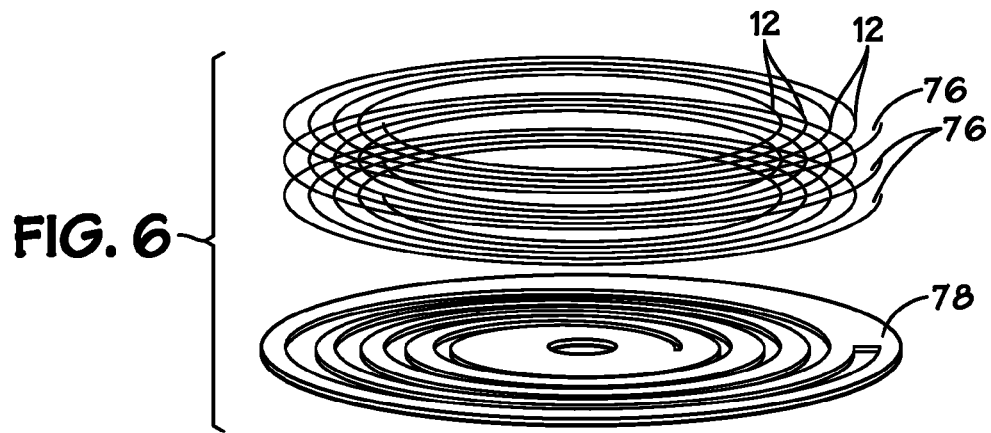
Figure 7:
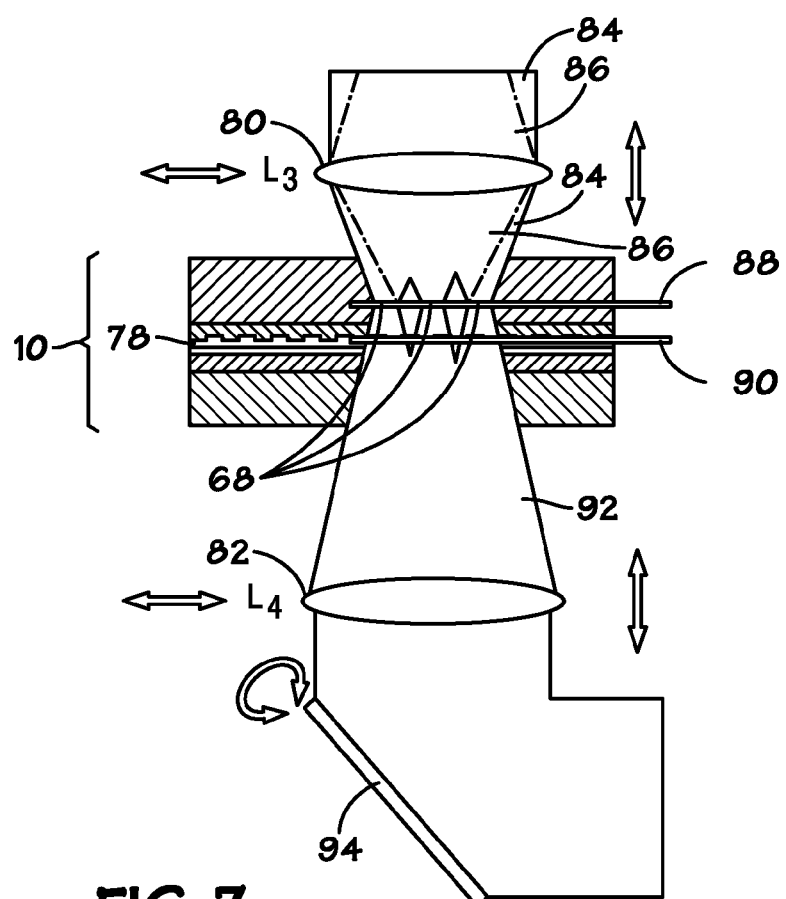
Figure 8:
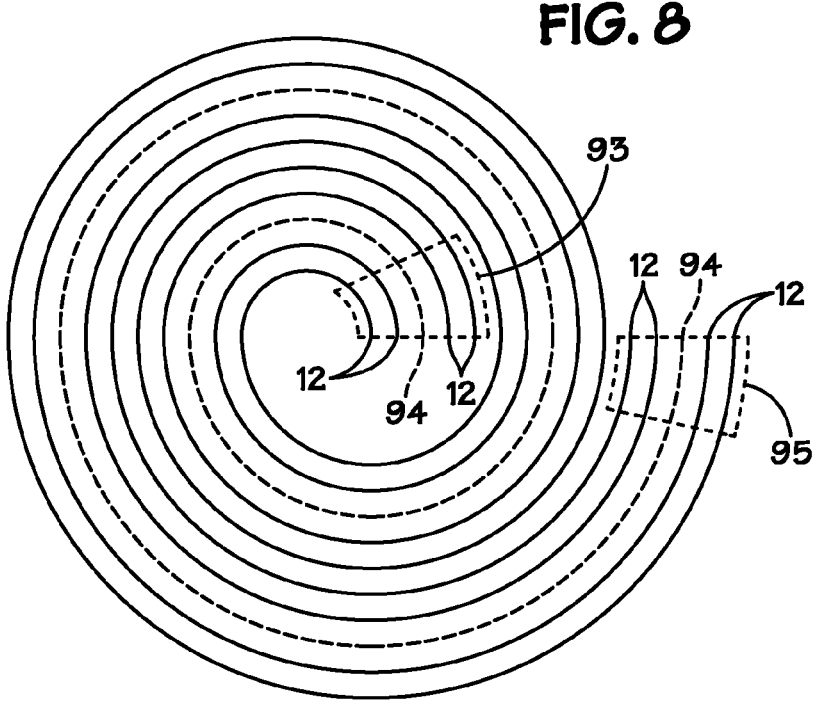
Figure 10:
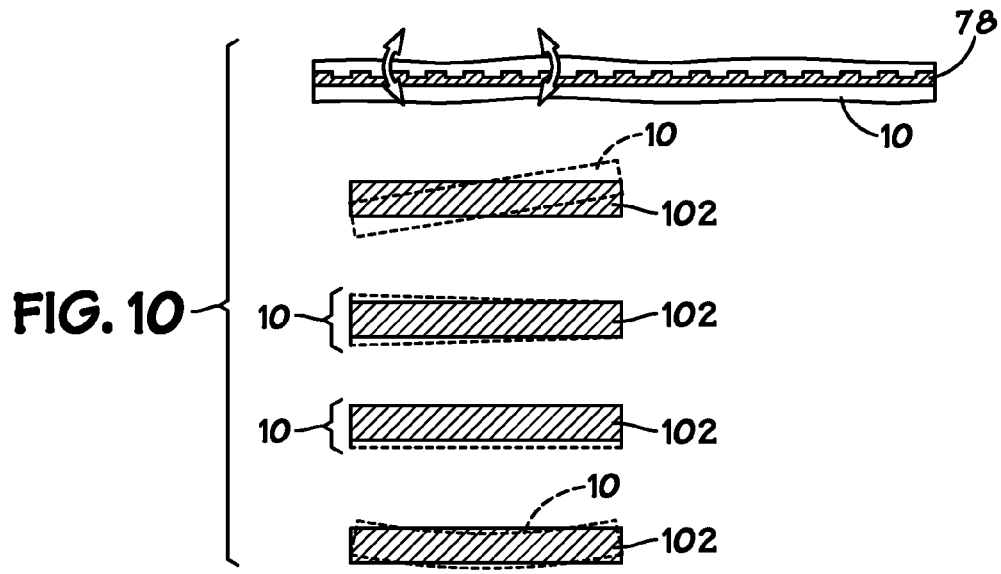
Figure 9A:
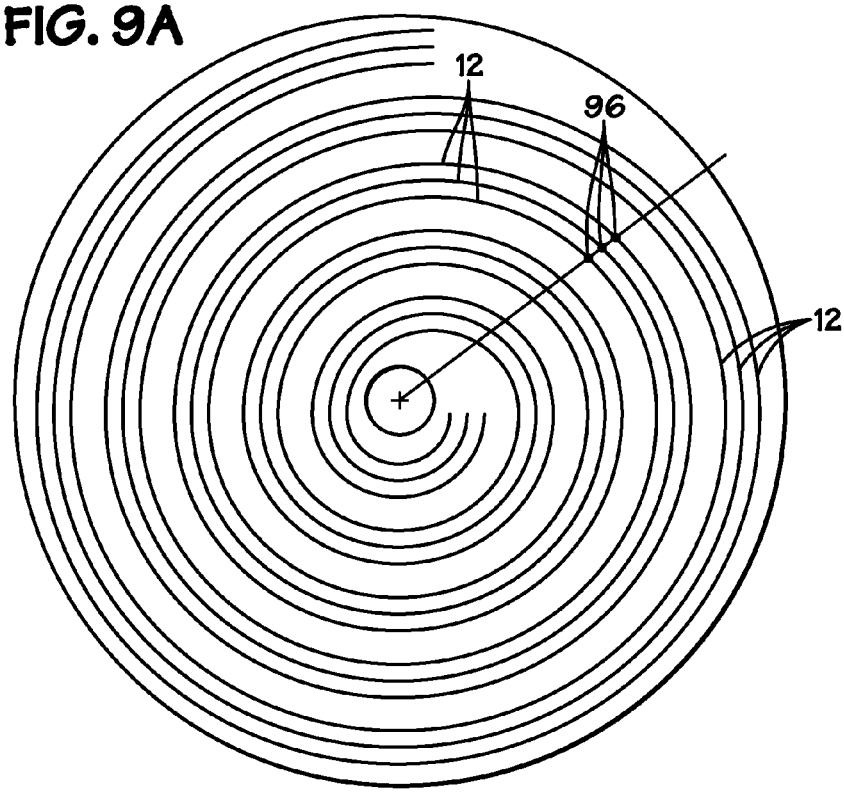
Figure 9B:
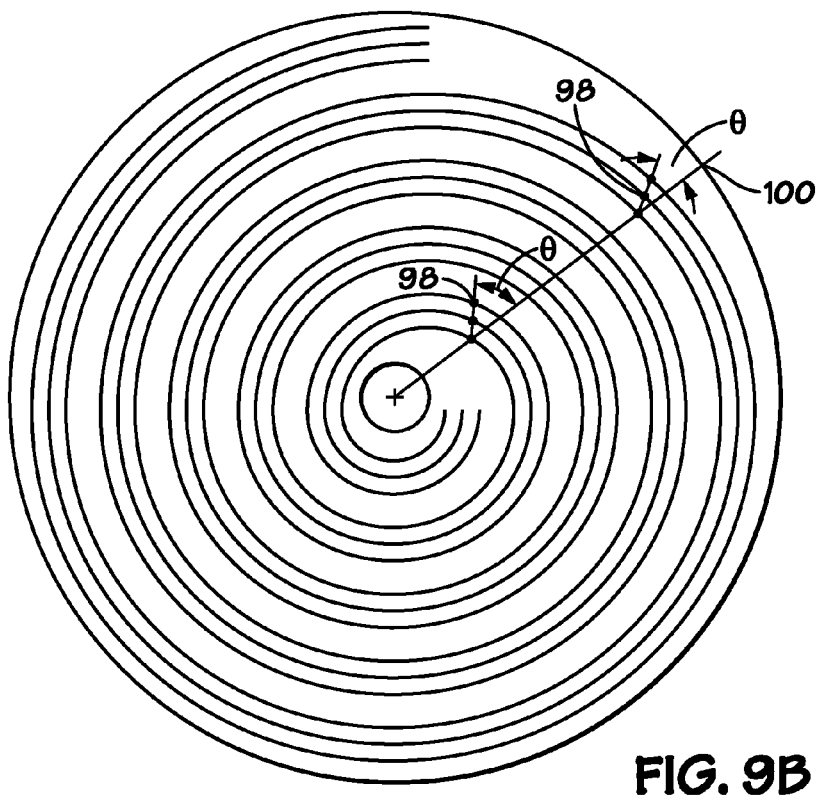
Figure 11:
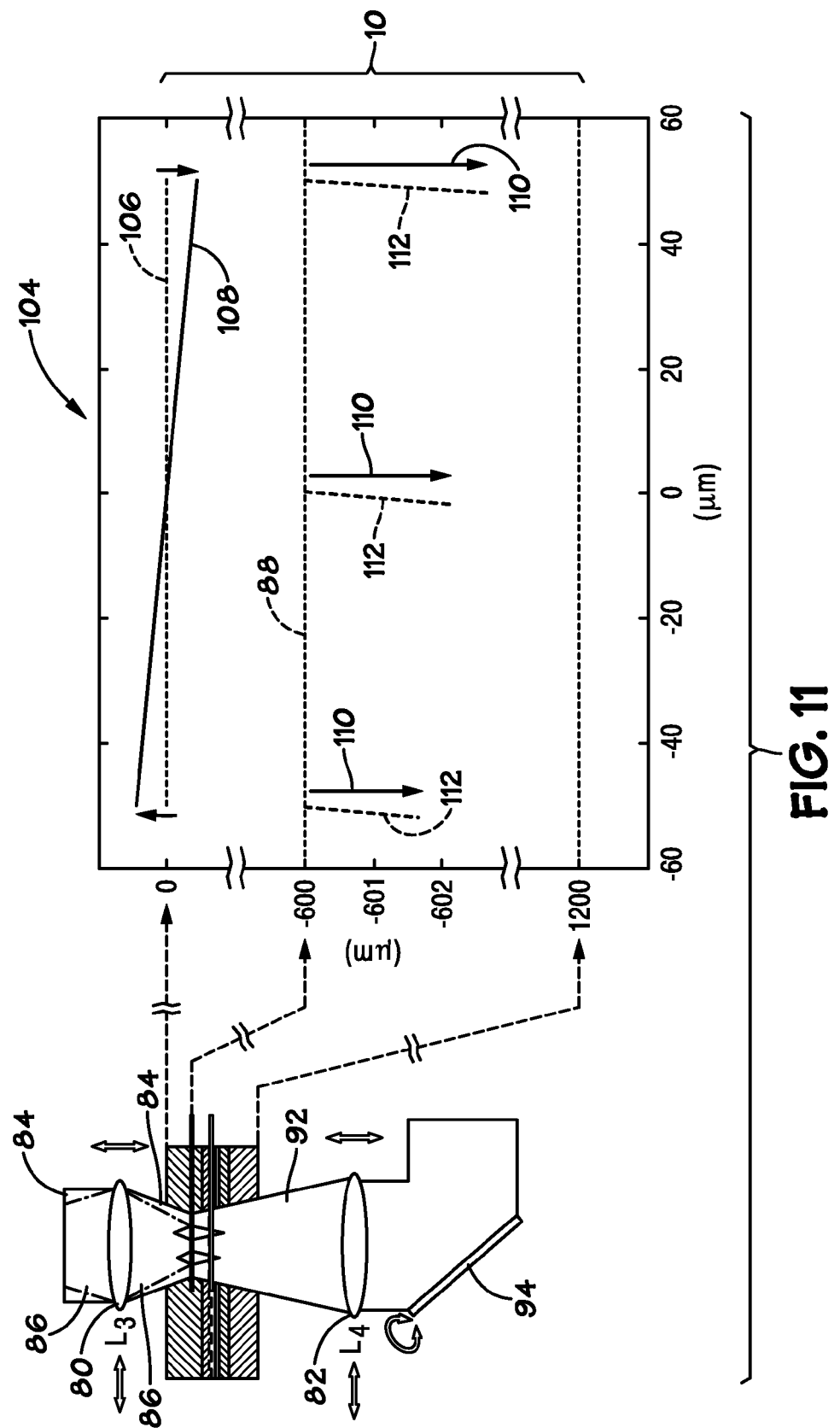
Figure 13:
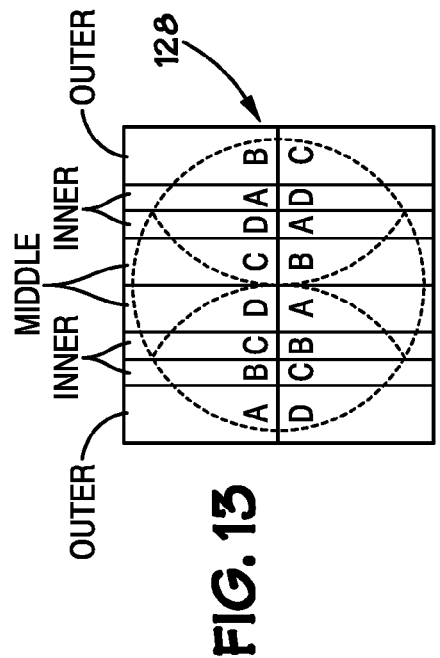
Figure 12:
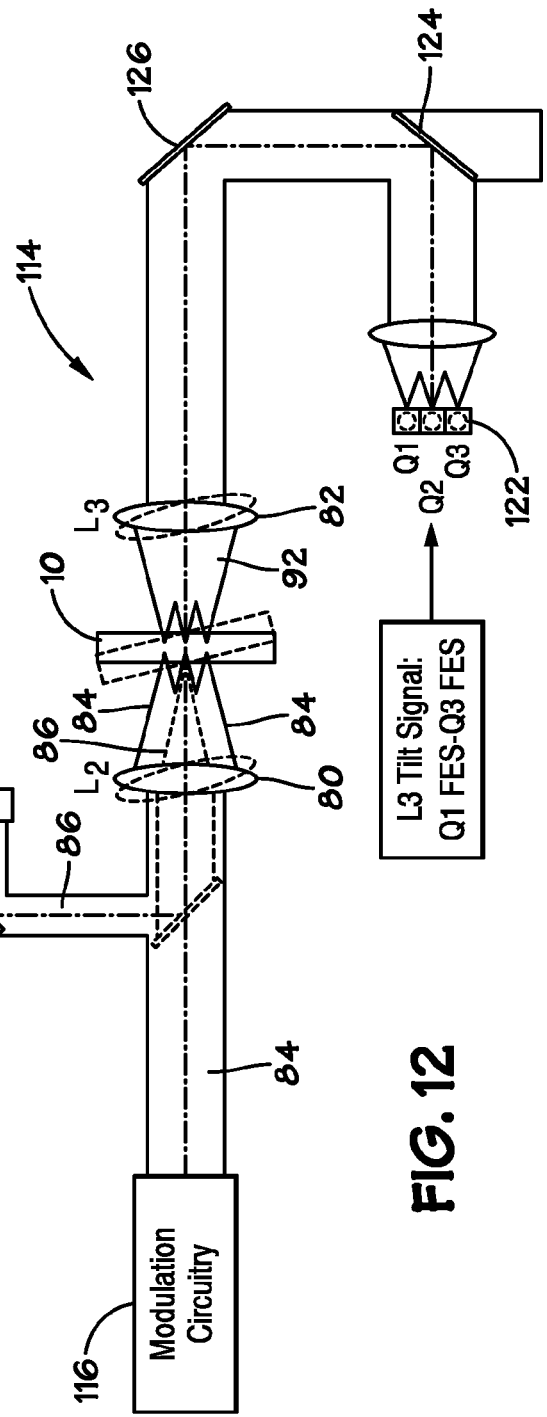
Figure 14:
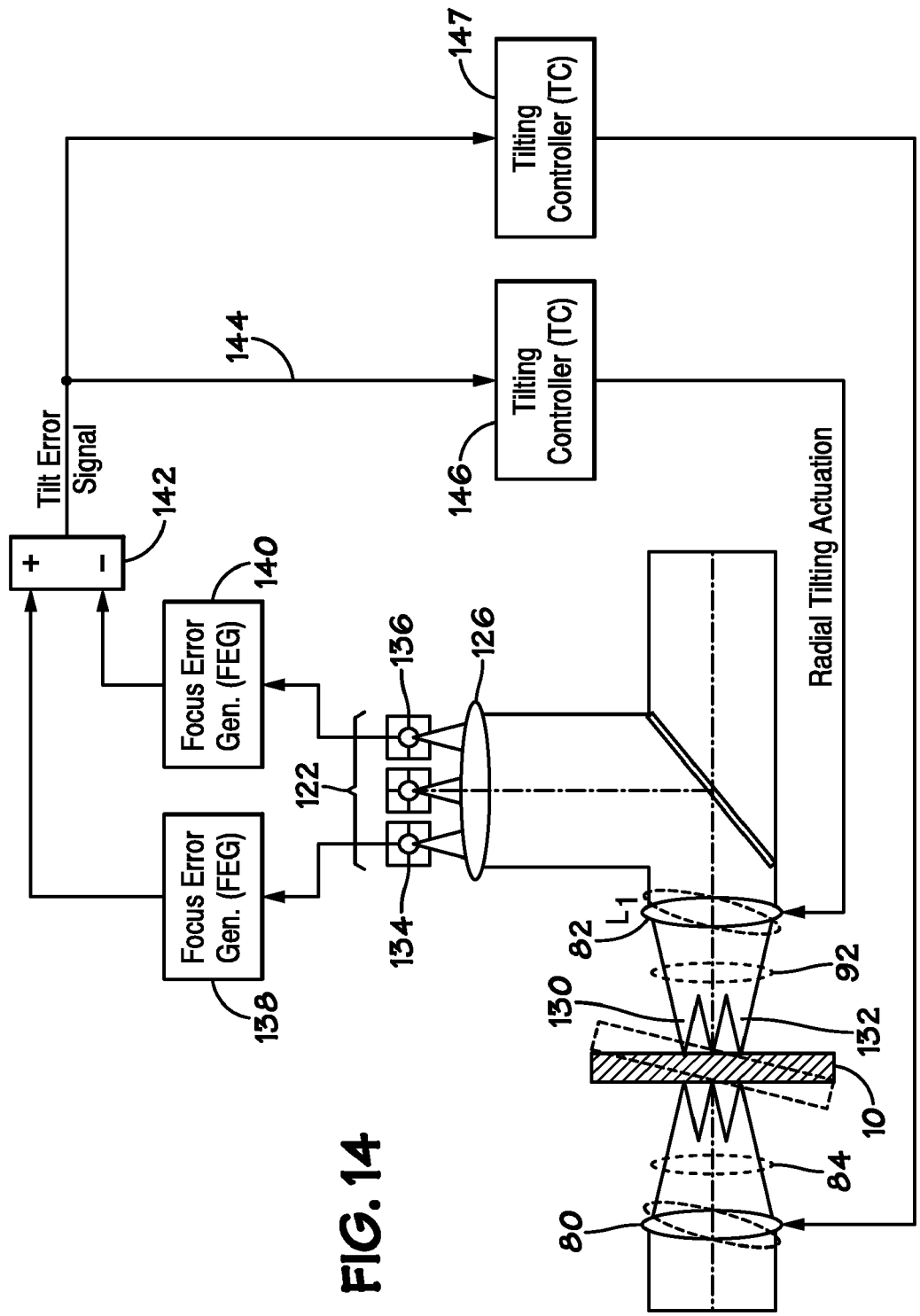
Figure 15:
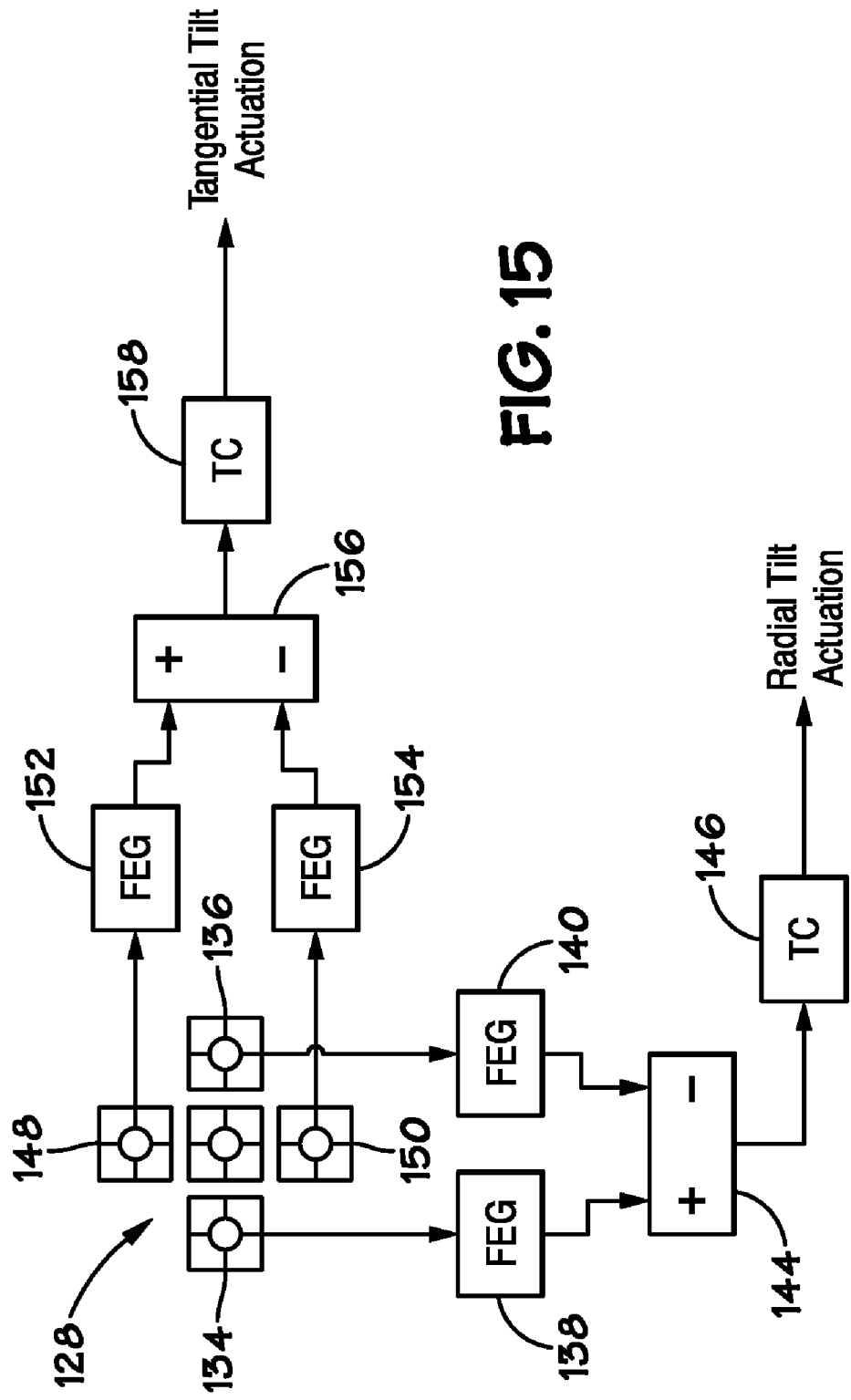

FIGS. 3A and 3B each illustrate a schematic diagram to compare a single beam replication technique and a multiple parallel beams replication technique, in accordance with embodiments;

FIG. 4 is a schematic diagram of a multi-head system recording on multiple tracks of a holographic disk in parallel, in accordance with embodiments;

FIG. 5 is a schematic diagram of a single head transmitting multiple beams to record on multiple tracks of a holographic disk in parallel, in accordance with embodiments;

FIG. 6 is a schematic diagram representing multiple data layers, multiple data tracks, and a reference layer in a holographic disk, in accordance with embodiments;

FIG. 7 is a schematic side view of multiple signal beams, multiple counter-propagating reference beams, and a tracking beam entering a holographic disk, in accordance with embodiments;

FIG. 8 illustrates a radial view of parallel data tracks with an encoded marked track in a holographic disk, in accordance with embodiments;

FIGS. 9A and 9B illustrate radial views of data tracks and illumination spot arrays in a holographic disk, in accordance with embodiments;

FIG. 10 is a schematic side view of several types of disk imperfections that may be compensated for in accordance with embodiments;

FIG. 11 is a graph representing an effect of disk tilting on illumination spots formed in a holographic disk, in accordance with embodiments;

FIG. 12 is a schematic diagram of a holographic recording system, in accordance with embodiments;

FIG. 13 is a diagram of an intensity distribution detected in a holographic recording system, in accordance with embodiments;

FIG. 14 is a schematic diagram of a tilt controlling system in a holographic recording system, in accordance with embodiments; and FIG. 15 is a schematic diagram representing radial and tangential tilt actuation in which may be used in a holographic recording system, in accordance with embodiments.

DETAILED DESCRIPTION

One or more embodiments of the present techniques will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for one of ordinary skill having the benefit of this disclosure.

Figure 1:
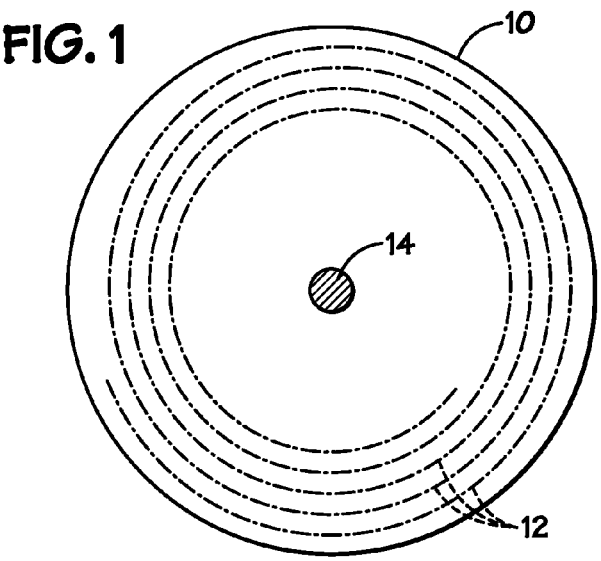
FIG. 1 illustrates an optical disk having data tracks, in accordance with embodiments.

Bit-wise holographic data storage systems typically involve recording by emitting two overlapping and interfering beams inside a recording medium (e.g., a holographic disk). Data bits are represented by the presence or absence of microscopically sized localized holographic patterns, referred to as micro-holograms, which act as volumetric light reflectors when illuminated by a focused beam. For example, the holographic disk 10 illustrated in FIG. 1 represents how data bits may be organized in a layer of the disk 10. Generally, the holographic disk 10 is a round, substantially planar disk with one or more data storage layers embedded in a transparent plastic film. The data layers may include any number of modified regions of the material substantially localized in depth that may reflect light, such as the micro-holograms used for a bit-wise holographic data storage. In some embodiments, the data layers may be embedded in the holographic recordable material which is responsive to the illumination intensity of light beams impinged on the disk 10. For example, in different embodiments, the disk 10 materials may be threshold responsive or linearly responsive. The data layers may be between approximately 0.05 µm to 5 µm in thickness and may have a separation between approximately 0.5 µm to 250 µm.

Data in the form of micro-holograms may be generally stored in a sequential spiraling track or tracks 12 in the information area from the outer edge of the disk 10 to an inner limit, although concentric circular or spiral tracks, or other configurations, may be used. The information area on the disk may further comprise different functional areas, such as lead-in, user data, and lead-out areas, as will be further described in FIG. 8. A spindle hole 14 may be sized to engage about a spindle in a holographic system, such that the disk 10 may be rotated for data recording and/or reading. The rotation of the spindle may be controlled by a feedback system to maintain a constant linear velocity or a constant angular velocity during the recording and/or reading process. Moreover, the disk spindle, the recording optics, and/or the reading optics may be moved by a translation stage or sled in a radial direction of the disk to allow the optical system to record or read across the entire radius of the disk.

Figure 2A:
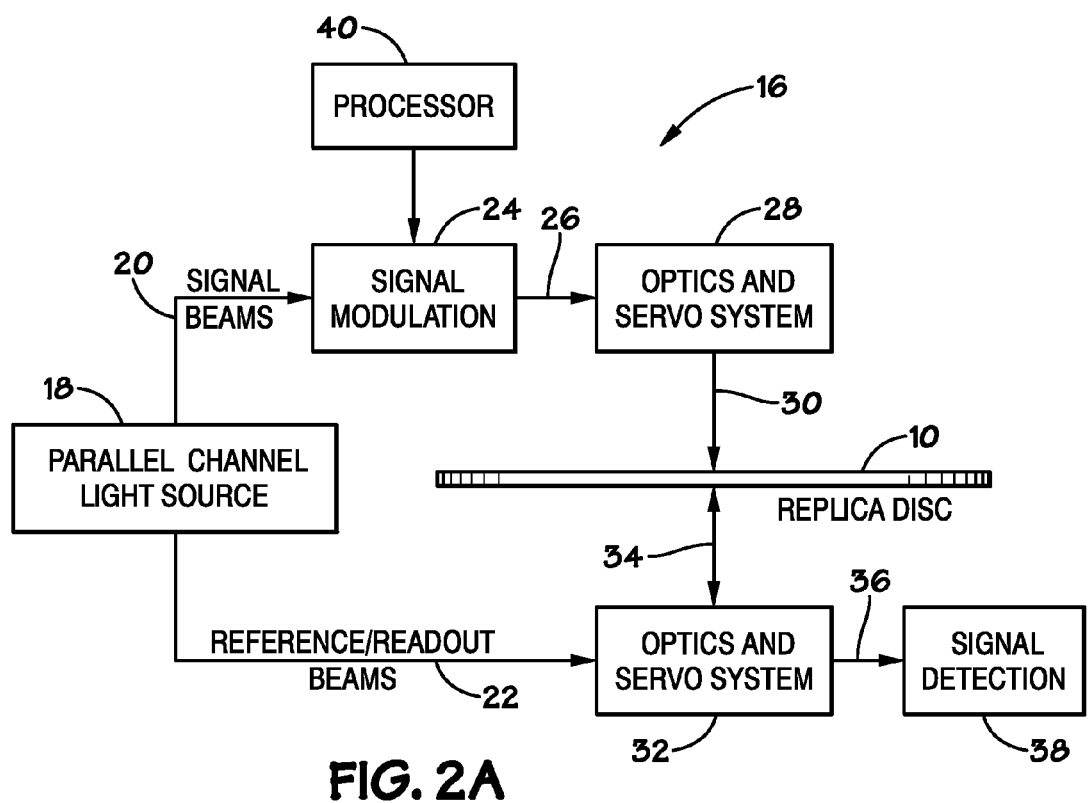
FIGS. 2A and 2B are block diagrams of micro-holographic replication systems, in accordance with embodiments.

A general system of recording micro-holograms to a holographic disk 10 is provided in the block diagram of FIG. 2A. The holographic system 16 includes a light source 18 which may be split into a signal beam 20 and a reference beam 22. As will be discussed, in some embodiments, the light source 18 (which may be a single light source or multiple single-mode polarized light sources) may emit multiple nearly parallel light beams to be recorded over parallel tracks 12 in a disk 10. The multiple source beams may also be split into multiple signal beams 20 and multiple reference beams 22. The signal beams 20 may be modulated (block 24) according to the data to be recorded on the disk 10. In some embodiments, a processor 40 may control the modulation (block 24) of the signal beams 20. The modulated signal beams 26 may be passed through an optics and servo-mechanic system 28, which may include various optical and servo-mechanic devices configured to focus the focused signal beams 30 on a particular location of the disk 10. For example, the optics and servo-mechanic system 28 may focus the focused signal beams 30 to a particular data layer or data tracks 12 in the disk 10.

The reference beams 22 may also be passed through an optics and servo-mechanic system 32 including various optics and servo-mechanic devices designed to focus the focused reference beams 34 to a particular data layer or data tracks 12 in the disk 10, such that the focused reference beams 34 overlap with the focused signal beams 30. Micro-holograms may be recorded in the holographic disk 10 in illuminated spots of an interference pattern formed by the two overlapping counter-propagating focused laser beams 30 and 34. In some embodiments, recorded micro-holograms may be retrieved from the disk 10 using the focused reference beams 34. Reflections of the focused reference beams 34, referred to as the data reflections 36, may be received at a detector for signal detection 38.

A stream of multiple micro-holograms may be recorded over a track 12 of the disk 10 by maintaining the overlapping counter-propagating focused beams to the desired track while rotating the disk 10 about a spindle positioned through the spindle hole 14. Generally, a certain degree of overlap of the counter-propagating beams is maintained to ensure that micro-holograms are accurately recorded in the appropriate track 12 and/or layer of the holographic disk 10. The optical and servo-mechanic systems 28 and 32 may be utilized to maintain a desired overlap dynamically with disk rotation during a micro-hologram recording process.

Such optical and servo-mechanical components 28 and 32 may add to the complexity of an end-user device for recording a holographic disk 10. The present techniques provide methods and systems for pre-formatting and/or pre-populating a holographic disk 10 with micro-holograms such that the disk 10 may be modified and/or erased by an end-user device using a single beam exposure. Pre-populating a holographic disk may refer to the pre-recording of micro-holograms during a manufacturing process of the holographic disk 10. The micro-holograms recorded during the pre-populating process may represent code, address, tracking data, and/or other auxiliary information. The pre-recorded micro-holograms may be subsequently modified and/or erased using a single beam rather than overlapping counter-propagating beams. Thus, an end-user system need not maintain overlapping counter-propagating laser beams to record data to a pre-populated holographic disk. Instead, an end-user system using a single-sided beam or beams may be used to record data by modifying and/or erasing micro-holograms on the pre-populated holographic disk.

While recording micro-holograms with counter-propagating beams to pre-populate a holographic disk may decrease the complexity of micro-hologram modification for an end user device, the process of pre-populating the disk may also be improved in accordance with the present techniques. As discussed, when pre-populating the holographic disk 10, the disk 10 is rotated in the holographic system such that the overlapping counter-propagating beams directed to the disk 10 may record micro-holograms over a selected track 12 and/or layer of the disk 10. The rotation speed of the disk 10, which is limited in part by the mechanical strength of the disk material, limits the speed (referred to as the transfer rate) at which micro-holograms can be recorded. For example, a typical disk rotation speed of a Blu-ray Disc™ may result in a transfer rate in a single-channel system of approximately 430 Mbits/second at 12×BD rate. At this transfer rate, the recording time per data layer in the disk is approximately 500 seconds.

In one or more embodiments, parallel micro-hologram recording techniques may be used to increase the transfer rate and reduce the recording time for a holographic disk 10. For example, parallel micro-hologram recording may involve directing multiple beams to a holographic disk to illuminate more than one track 12 in the disk 10. A beam may refer to a collection of light propagating in substantially the same direction through the same set of optical elements, and may include light originated from different light sources. Multiple beams may also be directed to more than one track 12 of the disk 10 from an opposite direction (i.e., counter-propagating beams) such that multiple overlapping counter-propagating beams may create an interference pattern of multiple illumination spots which result in multiple recorded micro-holograms in parallel tracks 12 of the disk 10. Furthermore, in some embodiments, the overlapping beams may interfere at a focused spot having a relatively small area with respect to the data layer plane. The focused illumination spots of the interference pattern may be separated by non-illuminated regions. By limiting the illuminated areas on a data layer, the depth spread of recorded micro-holograms may be limited to a desired size and/or limited on a desired data layer (e.g., between approximately 0.05 µm to 5 µm).

Figure 2B:
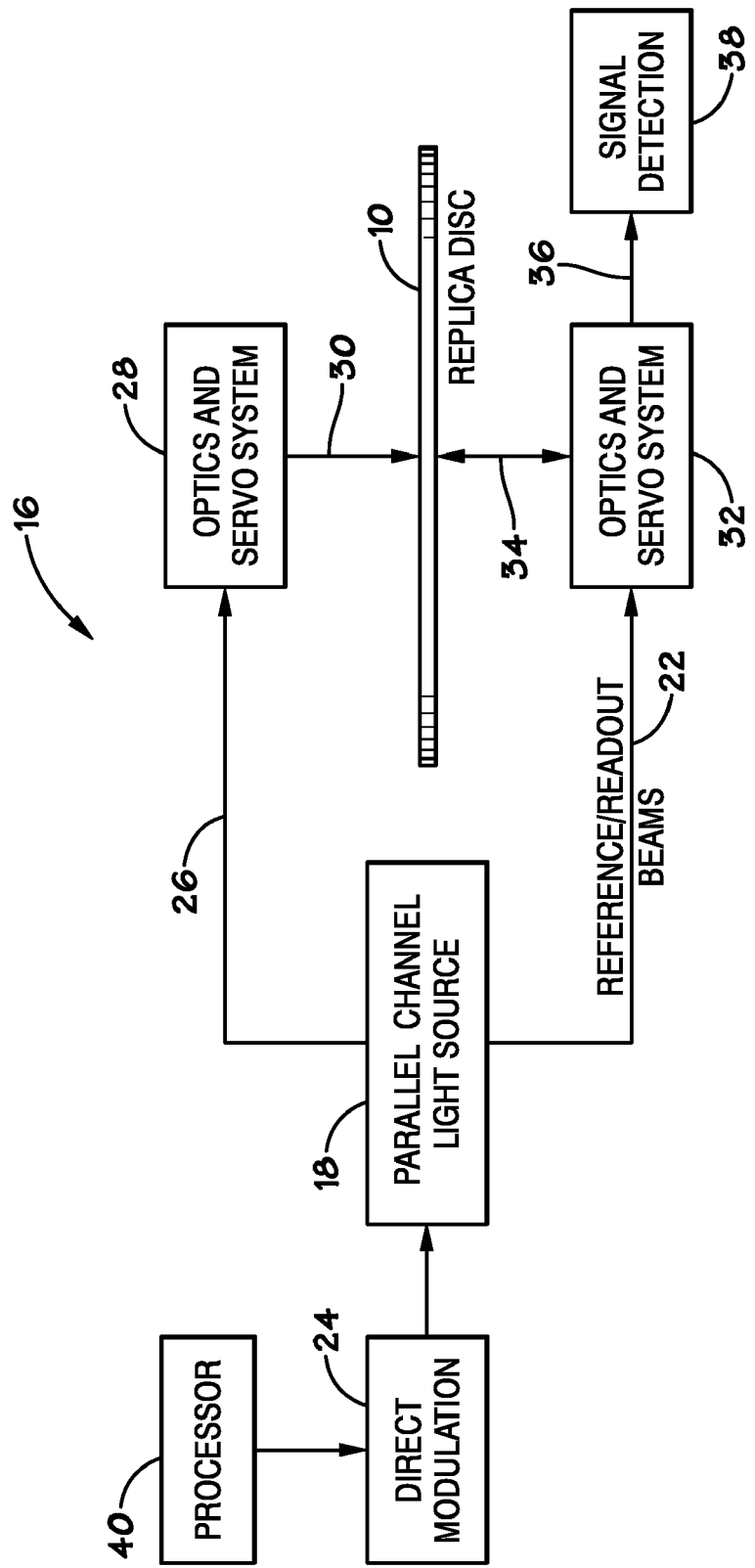

Furthermore, as provided in FIG. 2B, one or more embodiments of replication systems involve the direct modulation of the parallel channel light source 18. For example, the parallel channel light source 18 may be coupled to a modulator 24 suitable for directly modulating the parallel channel light source 18. The modulator 24 may be controlled by a processor 40 and may modulate the parallel channel light source 18 such that the modulated signal beams 26 emitted by the parallel channel light source 18 include the information to be recorded on the replica disk 10. Further details of this embodiment will be discussed with respect to FIG. 8.

The schematic diagrams in FIGS. 3A and 3B compare two different approaches to recording micro-holograms in parallel. In FIG. 3A, the wide field illumination using a single beam approach 42 includes using a single beam 44 to illuminate a relatively wide field (e.g., spanning multiple data tracks 12) in a master disk 46. The master disk 46 may contain data to be replicated onto the replica disk 10, and spanning multiple data tracks 12 with the single beam 44 may allow data on multiple data tracks 12 to be replicated concurrently. The transmitted signal beam 48 (or reflected signal beam, depending on different system designs) from the master disk 46 may be transmitted through an optical imaging system 50, represented as a lens in FIG. 3A, which may focus the signal beam 48 and direct the focused beam 52 to the replica disk 10. A single wide field reference beam 54 may also be directed to the opposite side of the replica disk 10, such that the focused signal beam 52 and the reference beam 54 may counter-propagate and interfere to form a hologram pattern 56. The replica disk 10 may have multiple data layers 76, as represented by the vertical lines $L_0$, $L_1$, and $L_2$.

However, the increased field of view of the illumination of the single beams 44 and 54 generally results in an increased depth spread of the recorded hologram in the replica disk 10. The increased depth spread characteristic may refer to an increased size of a hologram which may span through a greater thickness of the disk 10 (in the direction of the single beams 44 and 54) and may span through more than one layer. For example, while the single beams 44 and 54 may both be directed to layer $L_1$, the linear material typically used for such page-based wide field illumination systems may be relatively sensitive to the wide illumination field, and the materials in adjacent layers $L_0$ and $L_2$ may also be affected by the single beams 44 and 54. Thus, increased depth spread in hologram recording may limit or decrease the data capacity of the holographic disk 10, as recording one holographic pattern may require more than one data layer.

One embodiment of the present techniques is presented in the multiple parallel beam approach 58. Rather than illuminating a relatively wide field with a single beam, as in the single beam approach 42, the multiple beam approach 58 involves impinging a holographic disk 10 with multiple counter-propagating beams. In one embodiment, multiple signal beams 60 are directed to a master disk 46. Each beam may be focused on one track 12, and the transmissions 62 (or reflections, depending on different system designs) from the master disk 46 may be transmitted through an optical imaging system 50, represented as a lens in FIG. 3B, which may image the transmissions 62 to the replica disk 10.

Multiple reference beams 66 may also be directed to the opposite side of the disk 10. In some embodiments, the reference beams 66 and the signal beams 60 may be split from a common parallel channel light source 18 (FIGS. 2A and 2B), and in some embodiments, the multiple reference beams 66 (and thus the multiple signal beams 60) may be transmitted from different single-mode polarized light sources. In yet other embodiments, the multiple signal and multiple reference beams may both be modulated. The parallel reference beams 66 and the signal beams 64 may counter-propagate and interfere to form an interference pattern on a data layer (e.g., data layer $L_1$) in the disk 10. The interference pattern may include multiple illumination spots (e.g., each spot may correspond to the interference of one pair of counter-propagating beams in parallel beam channels) separated by non-illuminated regions. Each of the interference spots may form a micro-hologram 68 in the data layer $L_1$. Because only a small fraction of the data layer plane in a data layer $L_1$ is illuminated with respect to the area of the whole data layer plane (rather than a wide region in the single beam approach 42), each of the beam spots (or micro-holograms 68) in the illumination pattern may be relatively focused within a single data layer $L_1$, potentially increasing the data capacity of the disk 10.

In some embodiments, using multiple parallel beams for parallel micro-hologram recording may utilize multiple optical heads, as illustrated in FIG. 4. The optical heads 70 may emit a single beam, and multiple optical heads 70 in a replication system 16 (e.g., FIG. 2A) may be arranged to each impinge a beam 60 over a data track 12 in the disk 10, such that multiple beams 60 are illuminating multiple tracks 12 in parallel. In some embodiments, each optical head may have separate optics configured to focus the beam 60 on a track 12. Further, an additional set of optical heads may be configured to impinge the disk 10 from an opposite direction, such that the parallel beams 60 emitted from each optical head 70 counter-propagate to interfere in the data tracks 12 in one layer of the disk 10.

In another embodiment illustrated in FIG. 5, parallel micro-hologram recording using multiple parallel beams may utilize an optical head 72 which transmits multiple beams 60 of light in parallel, from one set of optics. In one embodiment, the multiple signal beams 60 from a single optical head 72 may be transmitted through a bundle of individual fibers suitable for transmitting a beam of light, such that each beam is discrete as it is transmitted out of the optical head 72 and onto multiple tracks 12 of a disk 10. Counter-propagating parallel signal beams 60 may be achieved by transmitting counter-propagating beams 66 from another optical head 74 on the opposite side of the disk 10 or by splitting multiple beams into multiple signal beams 60 and multiple reference beams 66 (as discussed with respect to FIGS. 2A and 2B).

Techniques for parallel pre-recording and/or parallel recording data on a holographic disk 10 involve configuring the holographic recording system such that each of the multiple illumination spots directed to a data layer 76 is registered to pre-format a data track 12 on the disk 10 throughout the recordation process. As the data track pitch is approximately 1.6 μm in a CD disk, approximately 0.74 μm for a DVD, and approximately 0.3 μm for a Blu-ray Disc™, substantial precision may be used to control the accuracy of the multiple illumination spots across multiple data tracks 12.

In one or more embodiments, focus and alignment techniques may be used to maintain the illumination spots with the appropriate data tracks 12 and/or data layer 76. In some embodiments, as illustrated in FIG. 6, each disk 10 may include one or more reference layers 78 having spiral grooves corresponding to the position of data tracks 12 in each layer 76. The grooves may further comprise encoded features or modulation marks, such as fixed frequency or modulated wobbles. These encoded features or modulation marks may provide address information for the data tracks or serve as marks for determining disk rotation speed for controlling disk spindle speed. As illustrated in FIG. 7, during a recordation process, a tracking beam 86 may be directed to the disk 10 along with the multiple signal beams 84. The multiple signal beams 84 and the multiple counter-propagating reference beams 92 may be focused to form illumination spots 68 along a data focal plane 88. The data focal plane 88 may be, for example, one or more data layers 76. The tracking beam 86 may be focused on a tracking focal plane 90 which corresponds to the reference layer 78. For example, in some embodiments, the tracking beam 86 may be focused on a target groove in the reference layer 78 corresponding to a central data track 12 of the multiple tracks 12 being recorded by the multiple signal beams 84 and multiple counter-propagating reference beams 92. In other embodiments, the tracking beam 86 may also include multiple beams, and may be focused on multiple grooves in the reference layer 78 corresponding to multiple data tracks 12 being recorded by the signal and reference beams 84 and 92.

Another embodiment for maintaining the illumination spots with the appropriate data tracks 12 and/or data layer 76 may involve including encoded alignment tracks, as illustrated in FIG. 8. In some embodiments, the replica disk 10 may include encoded alignment tracks 94 in parallel with other data tracks 12 in each data layer 76. The encoded alignment tracks 94 may be encoded with data and/or other modulation marks, such as wobbles, which identify the data tracks 12 surrounding each encoded alignment track 94. The information area on the disk 12 may further comprise one or more functional areas, such as lead-in areas, user data, and/or lead-out areas. For example, as illustrated in FIG. 8, the lead-in area 93 and lead-out area 95 identified by the dotted outlines may include features and information used to align the signal and reference beams with multiple target data tracks 12 in a target data layer 76 during an initialization process. Such features may include one or more grooves in the reference layer 78, for example. An initialization process may involve focusing multiple signal beams 84 on the reference layer 78 and analyzing the reflection or transmission of the multiple signal beams 84 from two or more target grooves in the reference layer 78.

In some embodiments, each encoded alignment track 94 may correspond to the data track 12 on either side of the encoded alignment track 94. Other embodiments may include different configurations of data tracks 12 and encoded alignment tracks 94 within a data layer 76. For example, in various embodiments, each alignment track 94 may correspond to two or more data tracks 12 on either side, or one or more data track 12 on one side, etc. In yet another embodiment, alignment track 94 may be a modulated data track. As each encoded alignment track 94 may be used to identify one or more data tracks 12 in each layer 76 of a disk 10, aligning one of multiple beams with an encoded alignment track 94 may indicate alignment of the other beams with the data tracks 12 which correspond to the encoded alignment track 94. For example, one or multiple beams may be impinged on a data layer over multiple tracks, including multiple data tracks 12 and at least one encoded alignment track 94. A detector may detect the reflection of a beam with the encoded alignment track 94, and an accurate alignment of one beam with the encoded alignment track 94 may indicate an accurate alignment of the multiple beams with the multiple data tracks 12 corresponding to the encoded alignment track 94. Therefore, a disk 10 configuration including encoded alignment tracks 94 may enable tracking and/or alignment of beams during a replication process.

Moreover, in some embodiments, as illustrated in FIG. 9A, the distance between adjacent parallel signal or reference beams may be maintained according to the pitch of adjacent data tracks 12 being recorded to register multiple illumination spots on multiple targeted data tracks 12 in radial direction. In some embodiments, maintaining the registration of multiple illumination spots 96 on the multiple targeted data tracks 12 may involve adjusting the distance between the multiple signal and reference beams. In other embodiments, as illustrated in FIG. 9B, the distance between the multiple signal and reference beams may be fixed. If the fixed beams have a distance apart that is larger than the pitch of the data tracks 12, an array of the multiple signal and/or multiple reference beams may be angled to maintain the registration of illumination spots on the multiple targeted data tracks. More specifically, the orientation of the illumination spot array 98 (e.g., the line formed by the multiple illumination spots) may form an angle θ with respect to a radial direction 100 of the disk. This angle θ may change as the focal location moves from the center to edge of the disk or vise versa. The change of the orientation of the multiple illumination spots may be achieved through adjustment of the optic and servo system to maintain registration of the multiple illumination spots on multiple target data tracks, as will be further discussed below.

Focus and alignment techniques may include actuation and servo-mechanical techniques. Servo-mechanical techniques may decrease micro-hologram recording inaccuracies resulting from disk imperfections. As illustrated in FIG. 10, the holographic disk 10 may have a number of imperfections which decrease accuracy in a micro-hologram recording process. For example, the disk 10 may have an uneven surface, such that the surface of the disk 10 may cause beams to impinge the disk 10 inaccurately.

Inaccuracies may also result if, for example, the disk 10 is tilted with respect to an expected position 102, or if the disk 10 itself is imperfect. For example, the disk 10 may have top and bottom surfaces that are not parallel or the disk 10 may be thicker than a perfect disk 10, such that when a disk 10 is fitted on a spindle in a recording system, the position of the disk 10 or a layer 76 of the disk 10 deviates from an expected position 102. Furthermore, the disk 10 may be warped, as represented by the curved shape of the disk 10 with respect to the expected position 102. Such inaccurate positioning or imperfections may result in micro-hologram recording errors.

For example, FIG. 11 provides a graph 104 comparing expected and actual positions of a data layer 76 and data tracks 12 of a disk 10. The x- and y-axes of the graph 104 provide radial distance and axial distance (both in micrometers) of the illuminated area on disk 10, respectively. The radial center of the illuminated area may be at x=0 μm while the top and bottom surfaces of the disk are expected to be from y=0 μm to y=−1200 μm. As represented at y=0 μm, the top surface 108 of the disk 10 is tilted with respect to the expected position 106 of the top surface of the disk 10. This tilt may be due to disk imperfections, or due to a tilt of the disk with respect to the holographic recording system 10 (FIG. 1). If no adjustments are made to compensate for the tilt, inaccurate illumination spots may be formed at a data focal plane 88. For example, the arrows 110 represent expected illumination spots along the data focal plane 88. The spots may range between approximately −600 μm and −602 μm from the top surface 106 of the disk 10. Due to the tilt of the disk 10, the actual illumination spots 112 may deviate from the expected illumination spots 110 both axially and radially, possibly resulting in formation of illumination spots in the wrong track 12 or in the wrong layer, depending on the severity of the disk tilt or imperfection. Such deviations in forming illumination spots may result in inaccurately pre-formatting or pre-recording micro-holograms on the disk 10.

To reduce pre-recording inaccuracies, a holographic storage system 10 in one or more embodiments may employ tilt actuation using servo-mechanical devices to compensate for movement, inaccurate positioning, and/or imperfections of the disk 10. FIG. 12 is a schematic diagram illustrating an embodiment of a holographic replication system 114 for micro-hologram recordation using multiple counter-propagating beams 84 and 92 to record over multiple data tracks 12. Such actuation may include, for example, axially, tangentially, and/or radially tilting various optical components or moving the optical components closer to or farther from a disk 10. In some embodiments, the servo-mechanical components may be configured to move optical components in up to 5 degrees of freedom (e.g., translation along and rotation and/or tilt around an axial, tangential, and/or radial axis), and may further be configured to actuate the optical components in more than one degree of freedom simultaneously. In one or more embodiments, actuation of optical components may refer to a tilting, a rotation, and/or a translation of one or more optical components such as a lens, a galvo mirror, etc.

The replication system 114 may impinge multiple signal beams 84 and multiple counter-propagating reference beams 92 to interfere and form illumination spots on a holographic disk 10. The illumination spots formed on the disk 10 may correspond to the positions of micro-holograms written to multiple tracks 12 in the disk 10. For example, in one embodiment, a light source may transmit multiple source beams to modulating circuitry 116 which may be configured to directly modulate or indirectly modulate the multiple source beams to generate the multiple signal beams 84 to be recorded onto the disk 10. In other embodiments, the multiple signal beams and/or the multiple reference beams may be generated by transmitting the source light through or reflecting the source light off modulation marks on a master disk. In yet other embodiments, a spatial light modulator is used to generate the multiple signal beams and/or the multiple reference beams.

Before the multiple signal beams 84 are focused on a data plane in the disk 10, the multiple signal beams 84 may pass through a first optical system 80. The first optical system 80 may include optical components, such as lenses or filters, and may also include servo-mechanical components configured to control the movement of various optical components in the first optical system 80 such that the multiple source beams 86 emitted through the first optical system 80 to a disk 10 may be focused to form illumination spots (by interfering with the counter-propagating beams 92) on desired tracks 12 and in a desired data plane of the disk 10.

In some embodiments, the holographic recording system 110 may include a means of tracking control to compensate for tilting when recording micro-holograms over multiple data tracks 12. As discussed, a holographic disk 10 may sometimes wobble during a replication process. Furthermore, a holographic disk 10 may have imperfections or non-uniformities. Movement, imperfections, or non-uniformities in a replicate disk 10 may result in imperfect alignment of illumination spots on the desired data tracks 12 within the disk 10, as discussed with respect to FIG. 10. As such, during a pre-recording or recording process of a disk 10, dynamic actuation of optical components involving various degrees of freedom may be employed to compensate for such imperfect alignments between illumination spots and desired data tracks 12. For example, maintaining multiple signal beams 84 on respective target data tracks 12 may involve moving the lens(es) in the first optical system 80 backward or forward with respect to the disk 10, or tilting the lens(es) in various directions, as indicated by the dotted outline of a tilting lens (es) in the first optical system 80.

Tracking errors may be determined by impinging a tracking beam 86 with the multiple signal beams 84 to the disk 10. The tracking beam may be emitted from another light source 120 and may pass through various optical elements (e.g., polarizing beam splitter 122) before impinging the disk 10, depending on the configuration of the system 110. As previously discussed, the tracking beam 86 may be aligned with the multiple signal beams 84 before impinging the disk 10. While the multiple signal beams 84 may be focused on a focal plane 88 corresponding to a data layer 76 in which micro-holograms are written, the tracking beam 86 may be focused on a reference layer 78 in the disk 10 which includes multiple grooves corresponding to positions of data tracks 12 in the disk 10. For example, in some embodiments, the tracking beam 86 may be transmitted through the same first optical system 80 and focused on a target groove in the reference layer 78 corresponding to a central track of the multiple tracks 12 being recorded by the multiple signal beams 84 and multiple counter-propagating reference beams 92.

Reflections of the tracking beam 86 from the reference layer 78 may be received at a tracking detector 118. If the disk 10 wobbles or tilts, the focus of the tracking beam 86 may deviate from the target groove, which affects the light intensity of the reflected tracking beam 86 detected at the tracking detector 118. As the illumination of the multiple signal beams 84 on the desired data tracks 12 is aligned with the illumination of the tracking beam 86 on the target groove, a deviation of the tracking beam 86 from the target groove may correspond to a deviation(s) of the multiple signal beams 84 from the desired data tracks 12 in the focal plane 88 (FIG. 7). The tracking detector 118 may evaluate the intensity of the reflection of the tracking beam 86 to determine tracking errors. For example, the intensity distribution of the reflection of the tracking beam 86 may be compared with a threshold intensity or with a previously detected intensity.

If the tracking detector 118 determines a tracking error, a tracking error signal may be transmitted to the first optical system 80. Based on the tracking error signal, the first optical system 80 may adjust the tilt of one or more lenses in the optical system 80 to compensate for the tracking error. For example, if the disk 10 tilts counter clockwise in an axial direction, a lens in the first optical system 80 may also be tilted counter clockwise in an axial direction until the tracking beam 86 is again impinging the target groove in the reference layer 78. As the multiple signal beams 84 are passing through the same set of optical components of the first optical system 80 as the tracking beam 86, tracking deviations of the multiple signal beams 84 from the desired data tracks 12 may also be corrected.

The holographic recording system 114 may also include a second optical system 82 which includes various elements suitable for focusing the multiple reference beams 92 in the disk 10. As discussed, the multiple reference beams 92 may be impinged on the replica disk 10 from an opposite side as the multiple signal beams 84. The multiple reference beams 92 may be transmitted through various optical elements, such as the polarizing beam splitter 124 and the galvo mirror 126 to the second optical system 82 for impingement on the disk 10. The beams 84 and 92 may have similar intensity distributions and may create an interference pattern of multiple illumination spots to record micro-holograms over multiple tracks 12 in a data layer 76 of the disk 10. The second optical system 82 may also include servo-mechanical components configured to actuate components (e.g., lenses, filters, etc.) of the second optical system 82 in various degrees of freedom. For example, the second optical system 82 may adjust components to move forward or backward with respect to the disk 10, or to axially tilt clockwise or counter-clockwise to adjust for imperfect alignment between the multiple reference beams 92 and desired tracks 12 of the disk 10.

In some embodiments, the first optical system 80 and/or the second optical system 82 may move in response to a feedback loop. Transmission of the multiple signal beams 84 may be received at one or more detectors 122 which may analyze the intensity of the transmitted signal beams 84 to determine whether a tracking error has occurred. The detectors 118 and 122 may be used to generate tracking, focusing, and/or tilting error signals which may be transmitted to actuate components in the optical systems 80 and 82 to compensate for such errors. In one embodiment, focusing error signals (FES) may be obtained from conventional astigmatic method, and a tracking error signal may be obtained from a push-pull tracking signal directly off tracks 12 of modulation marks on a quadrant detector 122. In some embodiments, the second optical system 82 may be actuated based on the first optical system 80. For example, error and actuation signals transmitted to the first optical system 80 may also be transmitted to the second optical system 82. In other embodiments, the first and second optical systems 80 and 82 may share common servo-mechanical components, such that the second optical system 82 may actuate with the first optical system 80.

In some embodiments, titling error signals can be generated by utilizing detector 118, as shown in FIG. 13, which detects the light distribution change caused by tilting. For instance, the detection area 128 may correspond to light detected from an area of a data layer 76 (e.g., one or more data tracks 12 in a layer 76). Each of the different indicated letters A-D may represent a different intensity of detected light, and a certain intensity pattern may be indicative of tilting. The detector 118 may analyze the detected intensity pattern and generate a tilting servo error. The tilting error signal may be used to adjust optical components in the first optical system 80 to compensate for the detected tilting.

Furthermore, one or more focus error signals (FES) generated from one or more detectors 122 may be used to determine alignment errors of the multiple signal or reference beams with the target data tracks 12. For example, as illustrated in FIG. 14, the detector 122 may include an array of quadrant detectors which detect a transmission of the multiple signal beams 84 and/or a reflection of the multiple reference beams 92 from the disk 10. Each of the quadrant detectors 134 and 136 may measure an intensity of the transmitted or reflected beams 130 and 132, respectively, and transmit the beam intensity information of the detected beams to focus error generators (FEGs) 138 and 140. In one embodiment, the light intensity of reflections from different beams of an array of impinged beams may be detected to determine a tilt of the impinged array area. For example, a first beam 130 (e.g., a transmission or reflection of one of the multiple signal beams 84) may be detected at the quadrant detector 134 and transmitted to the FEG 138, which generates a first focus error signal and transmits this signal to a comparator 142. A second beam reflection 132 may be detected at the quadrant detector 136 and transmitted to the FEG 140, which generates a second focus error signal and transmits this signal to the comparator 142. The comparator 142 may compare each of the first and second focus error signals to determine a tilt of the disk 10. For example, if the first focus error signal is positive while the second focus error signal is negative, the comparator may determine that the first beam 130 has a high relative intensity and the second beam 132 has a low relative intensity, which may indicate that the disk 10 is tilted such that the disk position where the first beam 130 is impinged is tilted forward relative to the disk position where the second beam 132 is impinged. The comparator 142 may generate a tilt error signal 144 based on this comparison and transmit the tilt error signal to a tilting controller 146. The tilt error signal 144 may include information including an estimated tilt of the disk 10, which may be represented by the tilted dotted outline of the disk 10. In response, the tilting controller 146 may control the servo-mechanical components coupled to the first optical system 80 and/or the second optical system 82 and move various optical components (e.g., lenses, filters, etc.) to tilt relative to the disk 10, as represented by the tilted dotted outline of the lens in the first optical system 80 and the second optical system 82. In some embodiments, the same tilting controller 146 or more than one different tilting controllers 146 and 147 may be used to control the actuation of the various optical components in the first and second optical systems 80 and 82.

In different embodiments, different titling controllers may be employed to control different optical systems, including the first optical system 80 which impinges the multiple signal beams 84 to the disk 10. In some embodiments one tilting controller may be employed to control many optical systems. For example, one tilting controller 146 may communicate with servo-mechanical devices in both the first optical system 80 and the second optical system 82, such that the optical components in both systems 80 and 82 may be aligned. In some embodiments, tilting servo error signals can be generated by combining focus error signals generated from multiple quadrant detectors. For example, a quadrant detector may also be used to detect an intensity of the tracking beam 86.

In some embodiments, a two-dimensional tilting actuation system may be employed. For example, as illustrated in FIG. 15, a detection system 128 may include multiple quadrant detectors 134, 136, 148, and 150 arranged to detect reflected beams emitted in a two-dimensional array. The two-dimensional reflected beams may be detected to determine tilting of the disk 10 in two dimensions. For example, in addition to the radial tilting actuation discussed in FIG. 14, one or more embodiments may also detect reflected beams at quadrant detectors 148 and 150. The quadrant detectors 148 and 150 may measure beams reflected from a different direction from the surface of the disk 10 compared to the quadrant detectors 134 and 136 (e.g., latitudinal or longitudinal). As such, the quadrant detectors 148 and 150 may detect information suitable for employing tangential tilt actuation. The quadrant detectors 148 and 150 may transmit reflected beam intensity information to the FEGs 152 and 154, respectively, which each generate and transmit focus error signals to the comparator 156. Based on the comparison of the received focus error signals, the comparator 156 may generate and transmit a tilt error signal to the tangential tilt controller 158. While the radial tilt controller 146 discussed in FIG. 14 may control servo-mechanical components configured to control the tilt of optical components in a radial direction, the tangential tilt controller 158 may control servo-mechanical components configured to control the tilt of optical components in a tangential direction. Thus, if a disk 10 is tilted radially or tangentially at an impinged area with respect to the holographic reading and replication system 16, optical components in the system 16 can be tilted to compensate for the tilt of the disk 10.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of recording data in a holographic disk, the method comprising:
   emitting a plurality of signal beams from a first set of optical components towards a first side of the holographic disk;
   emitting a plurality of reference beams from a second set of optical components towards a second side of the holographic disk;
   determining whether the plurality of signal beam spots is aligned in the plurality of target data tracks in a target layer of the holographic disk;
   determining whether each reference beam in the plurality of reference beams substantially overlaps with a corresponding signal beam in the plurality of signal beams to form a plurality of illumination spots during the recording of the holographic disk;
   adjusting one or more of the first set of optical components when one or more of the plurality of signal beams is determined to not align in the plurality of target data tracks in a target layer of the holographic disk; and
   adjusting one or more of the second set of optical components when one or more of the plurality of reference beams is determined to not substantially overlap with the corresponding signal beam in the plurality of signal beams to form a plurality of illumination spots.

2. The method of claim 1, wherein the plurality of illumination spots corresponds to a plurality of micro-holograms formed in the target data tracks in a target layer of the holographic disk.

3. The method of claim 1, wherein the holographic disk has a reference layer comprising one or more reference grooves.

4. The method of claim 3, comprising emitting a tracking beam from the first set of optical components to a target groove in the reference layer, wherein the target groove corresponds to the plurality of target data tracks.

5. The method of claim 3, wherein determining whether the plurality of signal beam spots is aligned in the plurality of target data tracks comprises focusing the plurality of the signal beams on the reference layer of the holographic disk and analyzing a reflection of the plurality of signal beams reflected from two or more target grooves in the reference layer in the holographic disk during an initialization process.

6. The method of claim 1, wherein determining whether each reference beam substantially overlaps with a corresponding signal beam to form a plurality of illumination spots comprises analyzing the intensity distribution of two or more of the transmitted signal beams through the disk.

7. The method of claim 1, wherein determining whether each reference beam substantially overlaps with a corresponding signal beam to form a plurality of illumination spots comprises analyzing the intensity distribution of two or more of the transmitted reference beams through the disk.

8. The method of claim 1, comprising adjusting the second set of optical components based on the adjustment of the first set of optical components.

9. The method of claim 1, wherein adjusting the first set of optical components comprises tilting one or more lenses in one or more of, a tangential, or a radial direction.

10. The method of claim 1, wherein adjusting one or more of the first set of optical components and the second set of optical components comprises rotating an optical element to achieve a position change of the plurality of the signal beams in one or more of an axial, a radial, and a tangential direction.

11. The method of claim 1, wherein adjusting one or more of the first set of optical components and the second set of optical components comprises translating a set of lenses in one or more of an axial, a radial, and a tangential direction.

12. The method of claim 1, wherein adjusting the first set of optical components comprises rotating of an optical component to achieve rotation of the orientation of arrangement of the plurality of the signal beams.

13. A system for recording micro-holograms on a holographic disk, the system comprising:
a first optical system configured to focus a plurality of signal beams in a plurality of target data tracks in one or more target data layers from a first side of the holographic disk, wherein the first optical system is coupled to a first set of servo-mechanical devices configured to actuate a first set of optical components in the first optical system to align each of the plurality of signal beams with a respective track of a plurality of target data tracks; and
a second optical system configured to transmit a plurality of reference beams towards the target data layer from a second side of the holographic disk, wherein the first side is opposite from the second side, and wherein the second optical system comprises a second set of optical components configured to be actuated to align each of the plurality of reference beams with a respective signal beam of the plurality of signal beams to form an interference pattern in a respective track of the plurality of target data tracks in the one or more target data layers.

14. The system of claim 13, wherein the second optical system comprises a second set of servo-mechanical devices, and wherein the second set of optical components is configured to be actuated by the second set of servo-mechanical devices.

15. The system of claim 13, wherein the first optical system is coupled to a first set of detectors configured to receive a reflection comprising a reflection of the plurality of signal beams from two or more grooves in a reference layer of the holographic disk wherein the first set of detectors is configured to provide an error signal and communicate the error signal to the first optical system.

16. The system of claim 13, wherein the second optical system is coupled to a second set of detectors configured to receive a transmission of one or more of the plurality of the signal beams or a transmission of the one or more of the plurality of the reference beams, and wherein the second set of detectors is configured to provide error signals and communicate the error signals to the second optical system.

17. The system of claim 13, wherein the first optical system is configured to actuate a first set of lenses in the first set of optical components by tilting the first set of lenses in one or more of a radial, and a tangential direction.

18. The system of claim 13, wherein one or more of the first optical system and the second optical system are configured to actuate an optical element by tilting it in one or more of a radial, and a tangential direction.

19. The system of claim 13, wherein the first optical system is configured to actuate an optical element by rotating it along an axis of propagation of the plurality of signal beams.

20. The system of claim 13, wherein the first optical system is configured to focus a tracking beam on a target groove in a reference layer of the holographic disk.

21. The system of claim 20, wherein the first optical system is coupled to a third detector configured to receive a reflection of the tracking beam from the target groove in the reference layer.

22. The system of claim 21, wherein the third detector is configured to analyze the reflection of the tracking beam and provide error signals to the first optical system based on the reflection analysis.

23. The system of claim 22, wherein the first optical system is configured to translate the first set of lenses in the first set of optical components in one or more of the axial, radial, or tangential directions in response to the error signals.

24. A system for pre-formatting a holographic disk, the system comprising:
a first optical head configured to impinge a plurality of signal beams to a plurality of data tracks in the holographic disk and configured to impinge a tracking beam to a target groove in a reference layer in the holographic disk, wherein the target groove corresponds to the plurality of data tracks;
a second optical head configured to impinge a plurality of reference beams to the plurality of data tracks, such that the plurality of signal beams and the plurality of reference beams interfere in a data layer to form an interference pattern comprising a plurality of illumination spots;
a tracking detector configured to detect a reflection of the tracking beam from the holographic disk and configured to generate a first set of error signals when the reflection of the tracking beam indicates that the tracking beam is not focused on the target groove;
a second set of detectors configured to detect one or more of a transmission of the plurality of signal beams or a transmission of the plurality of reference beams and configured to generate a second set of error signals when the plurality of reference beams are not aligned with respective signal beams of the plurality of signal beams; and
one or more servo-mechanical devices coupled to the first optical head and the second optical head and configured to receive the error signals from one or more of the tracking detector and the second set of detectors and actuate optical components in one or more of the first optical head and the second optical head in response to the error signals.

25. The system of claim 24, wherein the one or more servo-mechanical devices is configured to actuate optical components in one or more of the first optical head and the second optical head in response to the error signals to compensate for a movement of the holographic disk with respect to the system during a recording process.

26. The system of claim 24, wherein the one or more servo-mechanical devices is configured to actuate optical components in one or more of the first optical head and the second optical head in response to an imperfection of the holographic disk.

27. The system of claim 24, wherein the actuation of the optical components comprises one or more of a tilt, a rotation, or a translation of the one or more optical components in one or more of an axial, a tangential, or a radial direction with respect to the system.

28. The system of claim 24, wherein the second set of detectors is configured to generate one or two difference signal from the set of focus error signals and configured to use the difference signals to generate tilting servo error signals in radial or tangential directions.

29. The system of claim 24, wherein the one or more of the tracking detector and the second set of detectors are configured to generate a signal indicative of a rotation speed of the holographic disk.

30. The system of claim 24, comprising a servo-mechanical system configured to rotate the holographic disk at desired speed.

31. The system of claim 30, wherein the servo-mechanical system is configured to move the holographic disk relative to one or more of the first optical head, the second optical head, the tracking detector, and the second detector.

32. The system of claim 30, wherein the servo-mechanical system is configured to move one or more of the first optical head, the second optical head, the tracking detector, and the second detector relative to the holographic disk.

* * * * *